United States Patent
Janiszewski

[15] 3,659,764
[45] May 2, 1972

[54] METHOD AND APPARATUS FOR SEVERING CYLINDRICAL STOCK

[72] Inventor: Kasimir Janiszewski, 5426 W. Andover Road, Milwaukee, Wis. 53219

[22] Filed: Mar. 16, 1970

[21] Appl. No.: 19,918

[52] U.S. Cl. .................................................. 225/2, 225/96.5
[51] Int. Cl. ......................................................... B26f 3/00
[58] Field of Search .......................................... 225/2, 96.5

[56] References Cited

UNITED STATES PATENTS

| | | |
|---|---|---|
| 2,839,872 | 6/1958 | Cline ........................................ 225/96.5 |
| 3,268,137 | 8/1966 | Martin ................................... 225/96.5 X |
| 3,515,326 | 6/1970 | Saito et al. ............................... 225/96.5 |

FOREIGN PATENTS OR APPLICATIONS

| | | |
|---|---|---|
| 104,805 | 3/1917 | Great Britain ........................... 225/96.5 |

Primary Examiner—Frank T. Yost
Attorney—Wheeler, House & Wheeler

[57] ABSTRACT

The bar or tube stock to be severed is peripherally scored and rotated while deflecting the length to be severed and thereby angling its axis to that of the unsevered stock, the angle between the axes having its apex in the plane of the scoring.

5 Claims, 5 Drawing Figures

Patented May 2, 1972

INVENTOR
KASIMIR JANISZEWSKI

BY Wheeler, Wheeler, House & Clemency
ATTORNEYS

METHOD AND APPARATUS FOR SEVERING CYLINDRICAL STOCK

SUMMARY OF INVENTION

The stock to be severed projects from a rotatable chuck through which it may optionally be advanced as required to present a new length for severance. The length projecting from the chuck is engaged in a bearing mounted on a table which is pivoted on a diameter through the axis of rotation of the work and may be oscillated on its said pivot during work rotation with said chuck. Either during or preceding such oscillation, the work is peripherally scored on said diameter and it breaks cleanly on the score line.

A feature of the invention consists in the fact that the scoring may be almost entirely superficial, being little more than a scratch. Thus even work with hardened surfaces can be severed easily and quickly. Normally no burrs are left either on the stock or the severed length thereof.

DETAILED DESCRIPTION

Figure 1:
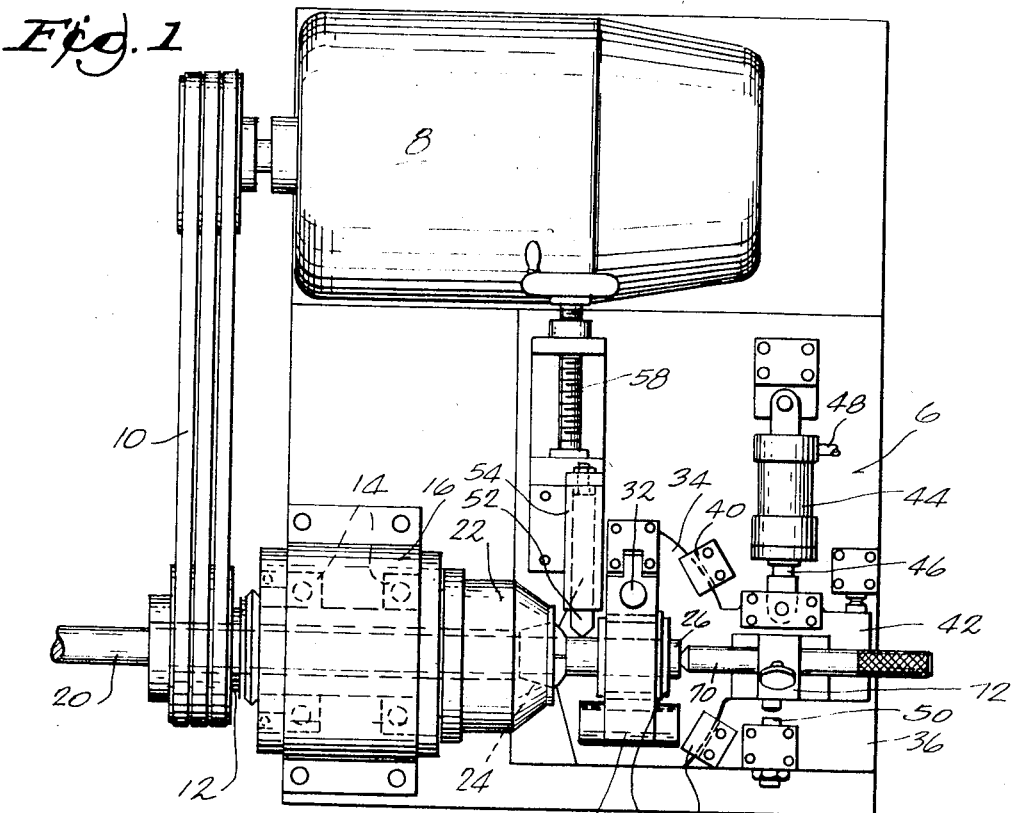
FIG. 1 is a plan view of apparatus comprising the invention.
Figure 2:
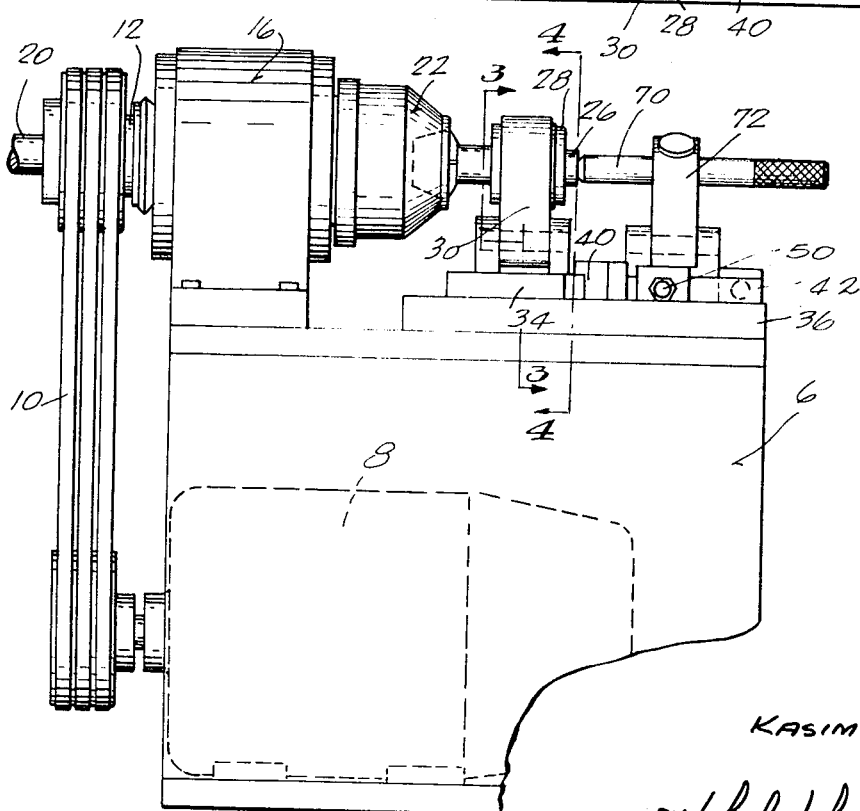
FIG. 2 is a front elevational view thereof.
Figure 3:
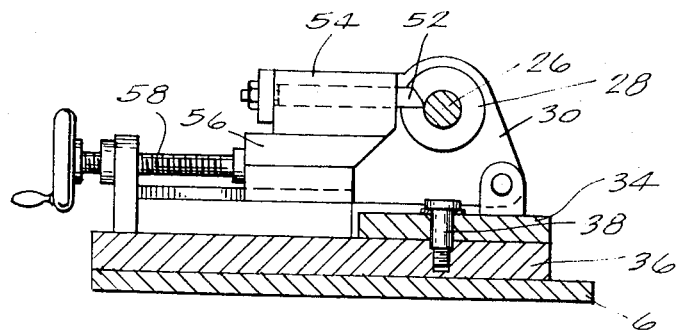
FIG. 3 is a view taken in section on the line 3—3 of FIG. 2.
Figure 4:
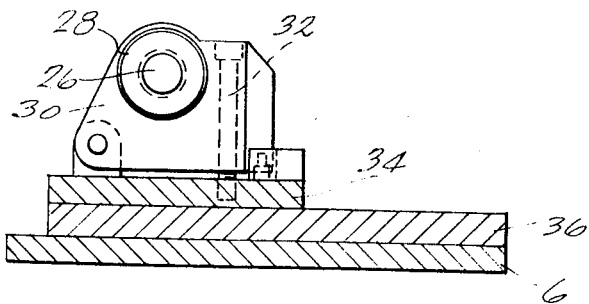
FIG. 4 is a view taken in section on the line 4—4 of FIG. 2.

The machine base 6 carries a motor 8 connected by belts 10 with a shaft 12 which may optionally be tubular and is rotatable within a bearing 14 for which bearing support 16 is mounted on base 6.

The workpiece 20 is rotatably mounted in the bearing 14 and projects through the chuck 22 carried by shaft 12 and preferably clamped by collet 24.

The length 26 which is to be severed is held rotatably in a bearing 28 initially aligned with bearing 16 to hold length 26 in a position to which bearing 16 is adjusted by bolt 32 on an oscillatable table 34. The table is supported on a bed 36 upon which it may oscillate about the axis of pintle 38, with guidance from the way-providing blocks 40. Between these blocks the oscillatory table 34 has an extension arm 42 which may be subjected to lateral pressure by any appropriate means. By way of exemplification, a ram cylinder is shown at 44 and provided with a piston 46 in thrust engagement with the side of the arm 42. When the ram is subjected to fluid pressure communicated to it through the pressure pipe 48, the entire table will be oscillated about its pintle 38 to the extent permitted by an adjustable stop screw 50. In such oscillation, the table carries with it the bearing 28 and the length 26 which is to be severed from the rotating workpiece 20.

To define the plane of severance, the workpiece is scored either prior to or during the deflection produced by ram 44. Preferably the scoring and the deflection occur concurrently. Any appropriate means may be provided for the scoring. Illustrated is a scoring tool 52 mounted in a slide 54 which has a threaded arm 56 in which the feed screw 58 is engaged. The tool preferably moves transversely of the workpiece to engage that side of the work which tends to be tensioned by the deflection.

Figure 5:
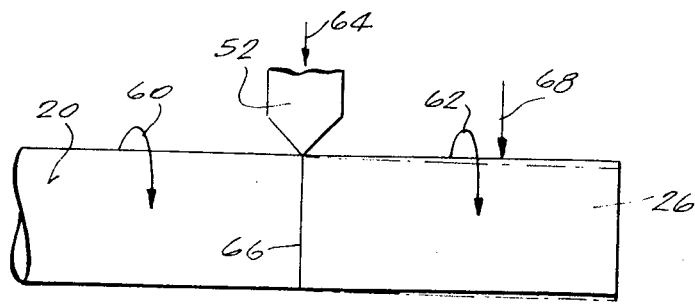
FIG. 5 is a diagrammatic plan view of the work in process of severance.

As shown diagrammatically in FIG. 5, the workpiece 20 is being rotated as indicated by the arrow 60. This inherently involves rotation of the section 26 which is to be severed, its rotation being indicated by arrow 62. The scoring tool 52 is advanced transversely of the workpiece as indicated by the arrow 64 to produce the score line 66. As the severable section 26 is deflected as indicated by the arrow 68, it rotates upon an axis which deviates angularly from the axis of the workpiece 20 and severance occurs in the plane defined by score line 66.

It is not essential to the invention that the workpiece be advanced axially through the chuck 22. If this is done, the length of the section to be severed therefrom may be predetermined by the adjustable stop 70 threaded into the column 72 upon the arm 42 of the table 34.

I claim:

1. A method of severing a length of cylindrical stock, which method comprises mounting the stock in a fixed bearing for rotation, engaging the length to be severed in a bearing which is initially substantially coaxial with the bearing first mentioned, rotating the stock and the said length in their respective bearings, scoring the periphery of the stock in the desired plane of severance intermediate said bearings, and exerting lateral pressure upon the length to be severed by oscillating about a diametrical axis in said plane the bearing in which such length is rotatable.

2. A method according to claim 1 in which such oscillation is effected concurrently with the scoring and the rotation.

3. Apparatus for severance of a length of cylindrical stock, such apparatus comprising means for mounting and rotating the stock, means for scoring the periphery of the stock by lightly scratching the stock circumferentially in the plane of desired severance by advancing a scratching tool into contact with the circumference of the stock, and means for deflecting in the direction of desired severance the length of stock to be severed, a base, the means for mounting and rotating the stock comprising a chuck for which said base is provided with a bearing, and means for rotating the chuck; the scoring means including a tool having means for mounting it on the base for movement to and from the stock, a deflecting means including a table having a pivotal connection with the base upon an axis substantially intersecting the axis of the stock, a bearing mounted on the table and in which a length of the stock is engaged for rotation and for pivotal movement with the table, and means for effecting pivotal table movement.

4. Apparatus for severance of a length of cylindrical stock, such apparatus comprising means for mounting and rotating the stock, means for scoring the periphery of the stock by lightly scratching the stock circumferentially in the plane of desired severance by advancing a scratching tool into contact with the circumference of the stock, and means for deflecting in the direction of desired severance the length of stock to be severed, a base, the means for mounting and rotating the stock comprising a chuck for which said base is provided with a bearing, and means for rotating the chuck; the scoring means including a tool having means for mounting it on the base for movement to and from the stock, a deflecting means including a table having a pivotal connection with the base upon an axis substantially intersecting the axis of the stock, a bearing mounted on the table and in which a length of the stock is engaged for rotation and for pivotal movement with the table, and means for effecting pivotal table movement, the pivotal table movement causing the length of stock to be severed to rotate on an axis at a slight angle to the axis of said chuck, whereby to subject one side of the stock to tension in the course of its rotation and the scoring means being mounted for movement toward engagement with the side subjected to tension.

5. Apparatus for the severance of the length of cylindrical stock, such apparatus comprising a base, a chuck bearing fixed on said base, a chuck rotatable in said bearing and provided with a flaring mouth, said chuck being adapted to receive the stock from which a length is to be severed, means for rotating the chuck, a table having means providing a pivotal connection with said base substantially intersecting the axis upon which said chuck rotates, bearing means on said table adapted to receive the length of stock to be severed, means for oscillating said table upon its fulcrum connection with said base whereby to deflect the axis of said last mentioned bearing means with respect to the axis of said chuck, and stock scoring means movable toward and from the axis of said chuck and engageable with stock rotatable with said chuck, said stock scoring means being disposed substantially in a plane including said fulcrum and at right angles to said axis.

* * * * *